United States Patent
Anello et al.

[15] 3,678,068
[45] July 18, 1972

[54] FLUOROCARBON ACIDS

[72] Inventors: Louis G. Anello, Basking Ridge; Richard F. Sweeney, Randolph Township, Dover, both of N.J.

[73] Assignee: Allied Chemical Corporation, New York, N.Y.

[22] Filed: Nov. 1, 1968

[21] Appl. No.: 772,844

[52] U.S. Cl. ............260/484 R, 117/139.5, 252/8.9, 252/351, 260/464, 260/465.6, 260/468 R, 260/504, 260/514 R, 260/535 H, 260/544 L, 260/544 Y, 260/557 R, 260/561 HL, 260/566 R, 260/615 BF
[51] Int. Cl. ..............C07c 59/22, C07c 69/66, C07c 53/36
[58] Field of Search............260/535 H, 484 R, 468 R, 514 R, 260/544 Y, 544 L

[56] References Cited

UNITED STATES PATENTS

| | | | |
|---|---|---|---|
| 3,453,333 | 7/1969 | Litt et al. ............................260/484 X |
| 3,231,604 | 1/1966 | Brace................................260/484 X |
| 3,409,647 | 11/1968 | Pittman et al......................260/535 X |

FOREIGN PATENTS OR APPLICATIONS

| | | | |
|---|---|---|---|
| 1,188,286 | 3/1965 | Germany..............................260/535 |

*Primary Examiner*—Lorraine A. Weinberger
*Assistant Examiner*—Paul J. Killos
*Attorney*—Jay P. Friedenson and Birgit E. Morris

[57] ABSTRACT

Propionic and butyric acids substituted in the 3- or 4-position, respectively, with a fluorinated alkoxy group, said alkoxy group terminated with a highly fluorinated branched chain or cyclic fluoroalkoxy group, their nitrile precursors and their esters, salt, amide, N-substituted amide and acid halide derivatives. These compounds are useful as surface-active agents and as oil and water repellency agents.

7 Claims, No Drawings

FLUOROCARBON ACIDS

This invention relates to novel fluorocarbon carboxylic acids having a terminal polyfluoroisoalkoxyalkyl group, to their nitrile precursors and to their salts, halide, alkyl ester, amido and N-substituted amido derivatives.

We have found a novel class of fluorocarbon acids which have highly fluorinated terminal branched-chain or cyclic fluoroalkoxy groups linked through the ether oxygen to a —$CF_2$— group which are effective surface-active agents and oil, stain and water repellents and which are intermediates for the formation of other oil and water repellents.

It is an object of the present invention to provide a novel class of fluorocarbon acids.

It is another object to provide highly effective, novel surface active agents.

Further objects will become apparent from the following detailed description thereof.

The novel fluorocarbon carboxylic acids of the invention have the formula

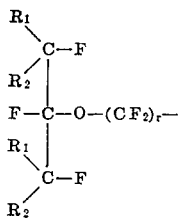

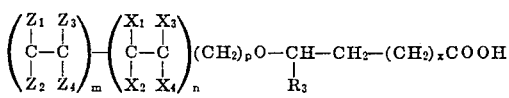

wherein $R_1$ and $R_2$ independently can be fluorine, chlorine or perfluoroalkyl and together can form a perfluoroalkylene group, with the proviso that both $R_1$ and $R_2$ cannot be chlorine; $R_3$ can be hydrogen or lower alkyl of one to six carbon atoms; $Z_1$, $Z_2$, $Z_3$ and $Z_4$ are independently selected from the group consisting of hydrogen, fluorine, and chlorine providing that not more than two of $Z_1$–$Z_4$ are chlorine; $X_1$, $X_2$, $X_3$ and $X_4$ are hydrogen, chlorine, or fluorine, providing no more than one of $X_1$–$X_4$ is chlorine; $r$ is an integer of 1 to 2; $m$ and $n$ are integers of from 0 to 75; the sum of $m$ and $n$ is 0–75; $p$ is an integer of 0 or 1, providing that when $p$ is 0, $n$ must be at least one and $X_3$ and $X_4$ must both be hydrogen; and $x$ is an integer of 0 or 1.

The fluorocarbon acids of the invention are prepared from their corresponding polyfluoroisoalkoxyalkyl iodides of the formula (2)

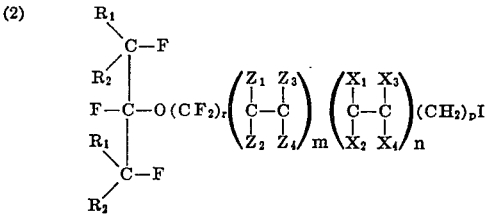

wherein $R_1$, $R_2$, $Z_1$–$Z_4$, $X_1$–$X_4$, $m$ and $n$, $r$ and $p$ have the meanings given above. These iodides can be reacted with $SO_3$ to form the corresponding pyrosulfates or with oleum to form the corresponding hydrosulfates. Upon hydrolysis of the pyrosulfates or hydrosulfates with an aqueous mineral acid, the corresponding alcohols are obtained. These alcohols can be reacted with an unsaturated nitrile in the presence of an alkali metal catalyst and the nitrile products hydrolyzed to form the present acids.

The iodides of formula (2) and their preparation are more fully described in copending U.S. application Ser. No. 633,359 filed Apr. 25, 1967 now U.S. Pat. No. 3,514,487. These iodides are prepared by reacting polyfluoroisoalkoxyalkyl iodides of the formula (3)

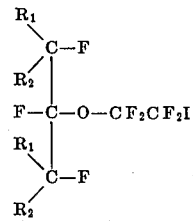

wherein $R_1$ and $R_2$ have the meanings given above with telomerizable unsaturated compounds having the formula $Z_1Z_2C=CZ_3Z_4$ and/or $X_1X_2C=CX_3X_4$ wherein $Z_1$–$Z_4$ and $X_1$–$X_4$ have the meanings given above. Suitable telomerizable compounds include ethylene, tetrafluoroethylene, chlorodifluoroethylene, difluoroethylene, and the like. The telomerization reactions can be initiated by heat, e.g. temperatures from about 100° to about 350° C., preferably from about 150° to 200° C., or by a free radical initiator, e.g. azobisisobutyronitrile, benzoyl peroxide and the like.

The polyfluoroisoalkoxyalkyl iodides can be prepared by reacting a suitable halogenated ketone with an ionizable fluoride salt, e.g. cesium fluoride or potassium fluoride, to form a fluorinated organic salt and reacting the organic salt with tetrafluoroethylene and iodine. Preparation of the polyfluoroisoalkoxyalkyl iodides is described in copending U.S. applications Ser. No. 492,276 filed Oct. 1, 1965 now U.S. Pat. No. 3,453,333 and Ser. No. 513,574 filed Dec. 13, 1965 now U.S. Pat. No. 3,470,256. The pertinent subject matter of these applications is hereby incorporated by reference.

Alcohols corresponding to the formula (4)

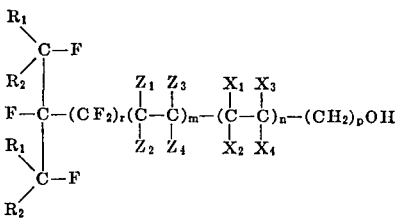

wherein $R_1$, $R_2$, $Z_1$–$Z_4$, $X_1$–$X_4$, $r$, $m$, $n$ and $p$ are as hereinabove described, are disclosed in copending U.S. application Ser. No. 721,089 filed Apr. 12, 1968. These alcohols can be prepared by reacting an iodide of formula (2) with sulfur trioxide or oleum and hydrolyzing the products with an aqueous acid to the free alcohol.

The alcohols can be reacted with an unsaturated nitrile in the presence of an alkali metal catalyst. This type of reaction is known and takes place readily at temperatures from about room temperature to about 75° C. at atmospheric pressure.

At least one mol of unsaturated nitrile per mol of acid is required for complete reaction and in general a small excess of the nitrile is employed, on the order of 1.1 to 1.5 mols of nitrile per mol of alcohol. Larger amounts can be employed, but no advantage is gained thereby.

Suitable unsaturated nitriles have the formula $R_3HC=CH(CH_2)_xCN$ wherein $R_3$ and $x$ are as defined above and include for example acrylonitrile, methacrylonitrile, propylacrylonitrile, allyl cyanide and the like.

Any alkali metal catalyst can be employed including lithium, potassium, sodium and the like. The catalyst concentration can vary from about 0.5 to 50 mol percent of the alcohol, but preferably 0.5 to 20 mol percent is adequate.

The excess alkali metal is reacted with concentrated sulfuric acid and the nitrile product recovered, as by distillation or other means as will be known to one skilled in the art.

The nitrile as prepared above is hydrolyzed with an acid in conventional manner with a strong mineral acid. Suitable acids include for example 30–80 percent, preferably 65–75 percent sulfuric acid, concentrated hydrochloric acid or phosphoric acid. From 1–10, preferably 1–5 mols of acid per mol of nitrile will ensure complete conversion. Hydrolysis is carried out at any convenient temperature, but in general increasing the temperature increases the rate of reaction. Preferably the hydrolysis is carried out at reflux temperature, or from about 100°–155° C.

The desired acids can be recovered and further purified in conventional manner, usually by distillation.

The nitrile can also be reacted with an alkyl alcohol of one to 18 carbon atoms in the presence of anhydrous hydrogen chloride to form an intermediate imino ester hydrochloride which can be hydrolyzed with water to form the alkyl ester of the acid and ammonium chloride. Any anhydrous alkyl alcohol can be employed, depending upon the ester desired, including primary alkyl alcohols of one to 18 carbon atoms, both straight chain and position isomers. The alcohol acts as a solvent for the reaction and, thus, an excess is preferred of between about 5–10 mols per mol of nitrile. The anhydrous hydrogen chloride can be bubbled through the alcohol solution over a wide temperature range, but usually is conducted from about room temperature to reflux at normal pressures.

When reaction is complete, an excess of water is added to hydrolyze the imino-ester hydrochloride and dissolve the ammonium chloride by-product. Conveniently, from about 5 to 20 mols of hot water per mol of ester is added. The ester product is recovered and can be purified if desired in conventional manner.

The alkali metal salts of the acids or esters prepared as above can be formed by neutralization with alkali metal hydroxides. These salts exhibit high surface active properties and may be used as surfactants in conventional manner, such as in the preparation of emulsions and surface coatings and to increase wettability in the dyeing of textile fibers. The free acids can be regenerated from these salts by acidification with an aqueous mineral acid solution.

The alkyl esters can also be reacted with ammonia or a primary alkyl or hydroxyalkyl amine to form the amide derivatives of the present acids. Hydroxyamides can be reacted with thionyl chloride to form N-substituted amides. This reaction proceeds in the presence or absence of a solvent, preferably at about 50°–110° C. The amide and N-substituted amide derivatives of the acids of the invention are useful as oil and water repellents.

The acid halide derivatives of the acids of the present invention can be prepared by reacting the free acid with thionyl chloride, benzyl trichloride or phosphorous pentachloride in conventional manner, preferably in the presence of an inert organic solvent such as chloroform. The acid fluoride can be prepared by reacting the acid chloride with potassium fluoride in the presence of a polar organic solvent such as acetonitrile or dimethylformamide. This reaction proceeds readily at room temperature although higher temperatures can be employed if desired. The acid halide derivatives serve as intermediates in the preparation of the corresponding amides and esters.

The criticalitY in the structure of the above-described acids is in the polyfluoroalkoxyalkyl tail portion of the molecule wherein an ether oxygen atom links a fluorinated carbon atom attached to two fluoroalkyl groups and at least one —$CF_2$— group.

According to the preferred embodiment of the present invention, acids having the following formula are particularly effective as surface-active agents.

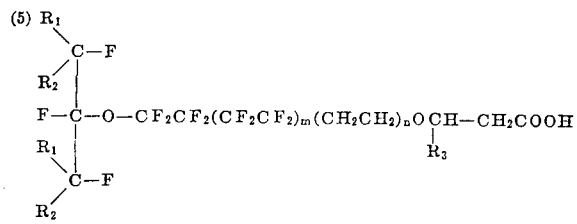

wherein $R_1$ and $R_2$ are fluorine or perfluoroalkyl of one to two carbon atoms, $m$ and $n$ are integers from 0–10 and $R_3$ is hydrogen or alkyl of one to five carbon atoms.

Other methods of preparing the acids of the invention and derivatives thereof will be known to one skilled in the art.

The compounds of the invention are useful as surface active agents. When added to water or aqueous solutions, the compounds lower the surface tension of the solution materially. They can also be added to organic solutions, i.e. hydrocarbon solvents such as benzene, toluene and xylene or halogenated hydrocarbons such as trichloroethane and carbon tetrachloride, to lower the surface tension. They also increase the solubility, detergency and wetting properties of aqueous and organic solutions.

The following examples are given to further illustrate the invention but it is to be understood that the invention is not meant to be limited to the details disclosed therein. In the examples, all parts are by weight unless otherwise noted.

EXAMPLE 1

4-Heptafluoroisopropoxy-3,3,4,4-tetrafluorobutyl iodide (38 parts) having a boiling point of 85°–87° C./100 mm were charged to a vessel fitted with a stirrer, dropping funnel, thermometer and a condenser connected to a trap at −78° C. 28 Parts of stabilized $SO_3$ were added, maintaining the temperature at 35°–40° C. Iodine was precipitated during the reaction. The mixture was heated to 70° C. for 2 hours to complete formation of the pyrosulfate product. The mixture was cooled to room temperature, and 100 parts by volume of 35 percent sulfuric acid were added slowly to hydrolyze the pyrosulfate to the alcohol. A small amount of $Na_2SO_3$ was added to remove any elemental iodine and the mixture heated for 1 hour at 105° C. Upon standing, two layers formed. The aqueous layer was washed with ether and the extract combined with the organic layer. The organic product was distilled over a spinnning band column.

A 70 percent yield of 4-heptafluoroisopropoxy-3,3,4,4-tetrafluorobutanol was recovered having a boiling point of 84° C./59 mm.

Elemental analysis calculated for $C_7F_{11}H_5O_2$: C, 25.5; F, 63.3; H, 1.6; Found: C, 24.9; F, 62.6; H, 1.6.

One hundred parts of the alcohol product, 1 part of sodium metal and 16.1 parts of acrylonitrile were charged to a vessel. The temperature dropped at first to 20° C., then rose to 54° C. The mixture was stirred overnight at 25° C. and made acid with 4.4 parts of concentrated sulfuric acid. The mixture was filtered and distilled. 3-[4-(heptafluoroisopropoxy)-3,3,4,4-tetrafluorobutoxy]propionitrile (77.9 parts) having the structure $(CF_3)_2CFOCF_2CF_2CH_2CH_2OCH_2CH_2CN$ were recovered as a liquid with a boiling point of 104°–105° C./5 mm. The structure was confirmed by infrared analysis which showed a nitrile absorption band at 4.4 microns.

Elemental analysis calculated for $C_{10}F_{11}H_8NO_2$: C, 31.3; F, 54.5; H, 2.1; N, 3.7; Found: C, 31.3; F, 54.3; H, 2.2; N, 3.8.

The nitrile prepared above (43.9 parts) and 53 parts of 70 percent sulfuric acid were combined and heated at 100° C. for 3 hours, then stirred at 60° C. overnight. Water was added in sufficient quantity to dissolve the ammonium sulfate byproduct. The water-insoluble oil was separated, dried and distilled.

An 81 percent yield, 38 parts, of 3-[4-(heptafluoroisopropoxy)-3,3,4,4-tetrafluorobutoxy]propionic acid of the formula $(CF_3)_2$—$CFOCF_2CF_2CH_2CH_2OCH_2CH_2COOH$ were recovered having a boiling point of 121°–123° C./4 mm.

The structure was confirmed by infrared analysis which showed a carboxyl absorption of 3.2–3.4 microns and a carbonyl absorption at 5.8 microns.

Elemental analysis calculated for $C_{10}F_{11}H_9O_5$: C, 29.9; F, 52.0; H, 2.2. Found: C, 29.6; F, 51.5; H, 2.4.

A 0.1 percent solution of the acid in water was tested as a surface-active agent by measuring the surface tension of the resultant solution. The test was carried out at 25° C. according to ASTM test D 1131-156 using a du Nouy tensiometer. The surface tension of water was 72.9 dynes/cm. The surface tension of the solution of the compound of the invention was 22.45 dynes/cm. Thus, these compounds are highly effective surfactants.

EXAMPLE 2

Twenty-three parts of the nitrile prepared in Example 1 were combined with 60 parts of 72 percent sulfuric acid and heated at 105° C. overnight. The water-insoluble oil was washed, dried and distilled.

An improved yield of 95 percent of the acid, 23 parts, were obtained having a boiling point of 120°–123° C./3.9 mm.

EXAMPLE 3

One hundred parts of 6-heptafluoroisopropoxy-3,3,4,4,-5,5,6,6-octafluoro-1-hexyl iodide were added to a vessel as in Example 1 containing 200 parts of 20 percent oleum preheated to 90° C. The reaction mixture was stirred at 100° C. for 1 hour, and cooled to room temperature. 840 Parts of water were added slowly, the temperature rising to 70° C. The mixture was heated at 100° C. for 16 hours. The mixture was washed with sodium bisulfate to neutralize elemental iodine. The oily product was separated, dried and distilled.

6-Heptafluoroisopropoxy-3,3,4,4,5,5,6,6-octafluoro-1-hexanol (50.2 parts) were obtained having a boiling point of 63° C./4 mm.

Elemental analysis calculated for $C_9F_{15}H_5O_2$: C, 25.1; F, 66.3; H, 1.2. Found: C, 24.5; F, 66.4; H, 1.2.

A mixture of 36.5 parts of the alcohol, 1 part of sodium metal and 10.6 parts of acrylonitrile were stirred together. The temperature dropped to 18° C. at first and gradually rose to 54° C. The mixture was cooled, stirred at room temperature for 5 hours, acidified with 2 parts by volume of 96 percent sulfuric acid, filtered and distilled. 3-[6-(heptafluoroisopropoxy)-3,3,4,4,5,5,6,6-octafluorohexoxy]propronitrile (31 parts) were obtained as a liquid having a boiling point of 78°–81° C./1 mm.

The structure, $(CF_3)_2CFO(CF_2CF_2)_2CH_2CH_2OCH_2CH_2CN$, was confirmed by infrared analysis.

Elemental analysis calculated for $C_{12}F_{15}H_8O_2N$: C, 29.8; F, 59.0; H, 1.7; N, 2.9; Found: C, 29.7; F, 58.8; H, 1.6; N, 2.8.

The nitrile prepared above and 50 parts of 70 percent sulfuric acid were admixed and heated at 110°–115° C. for 10 hours. The mixture formed two layers. The aqueous layer was extracted with ether, the extract combined with the organic layer, dried and distilled.

3-[6-(Heptafluoroisopropoxy)-3,3,4,4,5,5,6,6-octafluorohexoxy]propionic acid (31 parts) were recovered as a liquid having a boiling point of 110°–111° C./1 mm.

The structure $(CF_3)_2CFO(CF_2CF_2)_2CH_2CH_2OCH_2CH_2COOH$ was confirmed by infrared analysis which showed a carbonyl absorption at 5.8 microns.

Elemental analysis calculated for $C_{12}F_{15}H_9O_4$: C, 28.7; F, 56.8; H, 1.8. Found: C, 29.0; F, 56.3; H, 2.0.

EXAMPLE 4

One thousand and five parts of 20 percent oleum were charged to a vessel and 615 parts of 8-heptafluoroisopropoxy-3,3,4,4,5,5,-6,6,7,7,8,8-dodecafluoro-1-octyl iodide were added over a period of 1.5 hours while maintaining the temperature at about 95°–100° C. during the addition and for 1.5 hours longer. Twenty-two hundred parts of water containing 145 parts of $Na_2S_2O_5$ were added to effect hydrolysis and remove iodine. The mixture was heated at 100° C. for one hour, cooled, and the organic phase taken up in ether. The solution was dried and the ether flashed off. The oily residue was distilled.

A 72.5 percent yield of 8-heptafluoroisopropoxy-3,3,4,4,5,5,-6,6,7,7,8,8-dodecafluoro-1-octanol was recovered having a boiling point of 80°–82° C./4 mm.

Elemental analysis calculated for $C_{11}F_{19}H_5O_2$: C, 24.9; F, 68.1; H, 0.9. Found: C, 25.0; F, 68.5; H, 1.1.

The alcohol prepared above (45 parts), 1 part of sodium metal and 15 parts of acrylonitrile were charged to a vessel. The temperature dropped to 18° C., then gradually rose to 35° C. The mixture was stirred at room temperature for 6 hours, acidified with 2 parts by volume of concentrated sulfuric acid, filtered and distilled.

3-[8-(Heptafluoroisopropoxy)-3,3,4,4,5,5,6,6,7,7,8,8-dodecafluorooctoxy]propionitrile (41 parts) were recovered as a liquid having a boiling point of 85°–89° C/0.5 mm.

The structure $(CF_3)_2CFO(CF_2CF_2)_3CH_2CH_2OCH_2CH_2CN$ was confirmed by infrared analysis.

Elemental analysis calculated for $C_{14}F_{19}H_8O_2N$; C, 28.8; F, 61.9; H, 1.4; N, 2.4. Found: C, 29.1; F, 62.0; H, 1.4; N, 2.5.

The nitrile compound was hydrolyzed to the corresponding acid, 3-[8-(heptafluoroisopropoxy)-3,3,4,4,5,5,6,6,7,7,8,8-dodecafluorooctoxy]propionic acid following the procedure given in Example 1. This acid has the structure $(CF_3)_2CFO(CF_2CF_2)_3CH_2CH_2OCH_2—CH_2COOH$.

EXAMPLE 5

3-[4-(Heptafluoroisopropoxy)-3,3,4,4-tetrafluorobutoxy]-propionitrile (20 parts) as prepared in Example 1 and 50 parts of absolute methanol were stirred together. Thirteen parts of anhydrous hydrochloric acid were bubbled through the mixture when a white solid formed. The reaction temperature rose to 70° C. Fifteen parts of water-insoluble oil was separated and the aqueous phase washed with ether. The combined oil layers were dried and distilled.

Ten parts of 3-[4-(heptafluoroisopropoxy)-3,3,4,4-tetrafluorobutoxy]propionic acid methyl ester were recovered having a boiling point of 86°–88° C./5 mm.

The structure $(CF_3)_2CFOCF_2CF_2CH_2CH_2OCH_2CH_2COCH_3$ was confirmed by infrared analysis.

Elemental analysis calculated for $C_{11}F_{11}H_{11}O_4$: C, 31.7; F, 50.2; H, 2.6. Found: C, 30.0; F, 51.1; H, 2.1.

The methyl ester is a highly effective surfactant and lowers the surface tension of aqueous solutions.

The following compounds are prepared in a manner similar to Examples 1 to 4, substituting the appropriate starting materials

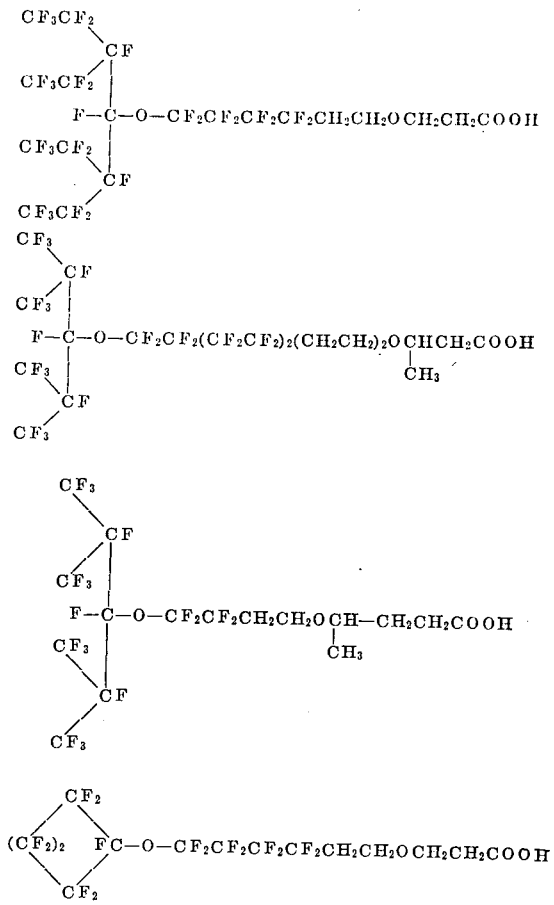

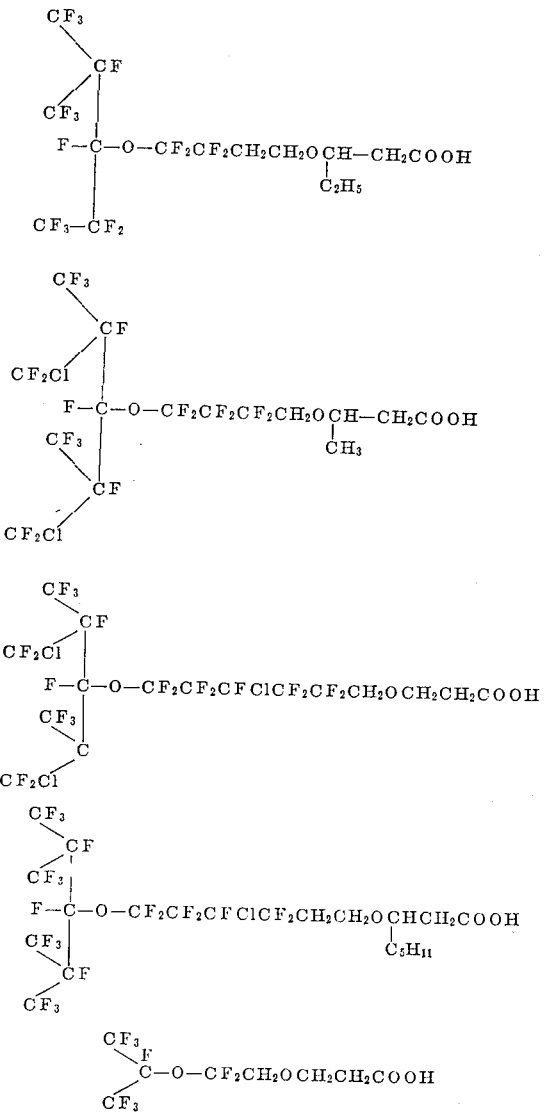

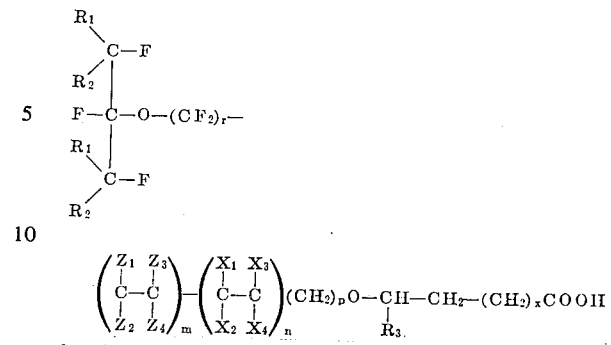

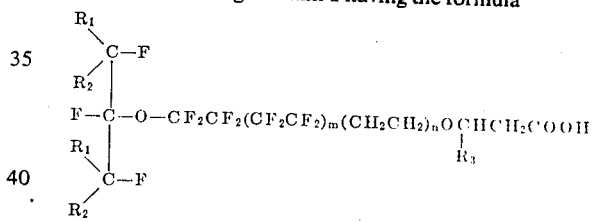

It will be apparent that numerous variations and modifications can be effected without departing from the novel concepts of the invention and the illustrative details described are not to be construed as imposing undue limitations on the invention.

We claim:

1. Fluorocarbon acids of the formula $$\left(\begin{array}{c}Z_1\ Z_3\\C-C\\Z_2\ Z_4\end{array}\right)_m \left(\begin{array}{c}X_1\ X_3\\C-C\\X_2\ X_4\end{array}\right)_n (CH_2)_pO-CH-CH_2-(CH_2)_xCOOH \atop R_3$$

wherein $R^1$ and $R^2$ are independently at each occurrence selected from the group consisting of fluorine, chlorine and perfluoroalkyl, and together can form a cyclic perfluoroalkylene group, with the proviso that both $R_1$ and $R_2$ cannot be chlorine; $R_3$ is hydrogen or lower alkyl; $Z_1$, $Z_2$, $Z_3$ and $Z_4$ are independently selected from the group consisting of hydrogen, fluorine and chlorine, with the proviso that no more than two of $Z_1$–$Z_4$ are chlorine; $X_1$, $X_2$, $X_3$ and $X_4$ are independently selected from the group consisting of hydrogen, chlorine, and fluorine with the proviso that no more than one of $X_1$–$X_4$ is chlorine; $r$ is an integer of 1–2; $m$ and $n$ are integers from 0–75; the sum of $m$ and $n$ is 0–75; and $p$ is an integer of 0–1 with the proviso that when $p$ is 0, $n$ must be at least one and $X_3$ and $X_4$ must be hydrogen; and $x$ is an integer of 0–1; their ester, salt, and acid halide derivatives.

2. Acids according to claim 1 wherein $m$ and $n$ are integers of 0–10.

3. Acids according to claim 1 having the formula wherein $R_1$ and $R_2$ are fluorine or perfluoroalkyl of one to two carbon atoms; $m$ and $n$ are integers from 0–10; and $R_3$ is hydrogen or alkyl of one to five carbon atoms.

4. 3-[4-(heptafluoroisopropoxy)-3,3,4,4-tetrafluoro-butoxy]propionic acid.

5. 3-[4-(heptafluoroisopropoxy)-3,3,4,4-tetrafluoro-butoxy]propionic acid methyl ester.

6. 3-[6-(heptafluoroisopropoxy)-3,3,4,4,5,5,6,6-octafluorohexoxy]propionic acid.

7. 3-[8-(heptafluoroisopropoxy)-3,3,4,4,5,5,6,6,7,7,8,8-dodecafluorooctoxy]propionic acid.

* * * * *